3,758,417
COPPER, ZINC, DIDYMIUM OXIDE-CONTAINING
CATALYSTS
Eugene F. Magoon, Walnut Creek, and Lynn H. Slaugh, Lafayette, Calif., assignors to Shell Oil Company, New York, N.Y.
No Drawing. Continuation-in-part of application Ser. No. 86,357, Nov. 2, 1970. This application May 21, 1971, Ser. No. 145,946
Int. Cl. B01j *11/06, 11/22*
U.S. Cl. 252—462   5 Claims

ABSTRACT OF THE DISCLOSURE

Methanol is produced by reaction of carbon oxides and hydrogen in the presence of a novel copper-zinc-didymium containing oxide catalyst.

This application is a continuation-in-part of co-pending application U.S. Ser. No. 86,357 filed Nov. 2, 1970.

BACKGROUND OF THE INVENTION

Methods for producing methanol by contacting carbon oxides, especially carbon monoxide, with hydrogen in the presence of metal oxide catalysts are known in the art. A commercial catalyst will typically contain zinc oxide and another metal compound as a promoter. For example, U.S. Pat. 2,904,575 discloses the production of methanol by the contacting of carbon oxides and hydrogen in the presence of a catalyst comprising a zinc oxide-chromia mixture. Production of methanol utilizing such catalysts suffers the disadvantages of requiring high temperatures (350° C. to 400° C.) and high pressures (4000–5500 p.s.i.g.) in order to produce economically attractive yields of methanol. Operating at these temperatures and pressures requires large capital expenditures and results in high operating costs.

Copper itself is inactive as a catalyst for the production of methanol. Copper oxide, although quite active in catalyzing the reaction of carbon monoxide and hydrogen to form methanol, is ineffective as a catalyst because in the reaction environment it is easily reduced to elemental copper. It has long been known that combining a difficulty-reduced metal oxide with copper oxide can in some instances produce an effective catalyst. For example, U.S. Pat. 1,818,165 discloses the combination of copper oxide and zinc oxide as a catalyst for the production of methanol. Other metal compounds with which copper oxide has been combined include metallic halides (U.S. Pat. 1,625,924), rare earth oxides (U.S. Pats. 1,791,568; 2,061,470; 2,904,575), rare earth fluorides (U.S. Pat. 1,707,331), and chromium-oxide (U.S. Pat. 3,326,956). A more detailed discussion of the prior art of copper containing catalysts for methanol production can be found in Natta, Catalysis, vol. III, ch. 8, "Synthesis of Methanol" (Rheinhold Publishing Company, 1955). These catalysts suffer from the disadvantage of producing only moderate to low yields of methanol when comparatively low temperatures are employed. For example, the copper-zinc-chromium containing oxide catalyst disclosed in U.S. Pat. 3,326,956 is perhaps the most active of the copper containing catalysts, yet at temperatures of 250° C.–260° C. and a pressure of approximately 600 p.s.i.g., the yield of methanol is only from about 0.36–0.61 kilogram per liter of catalyst per hour.

SUMMARY OF THE INVENTION

It has now been found that improved production of methanol is obtained by contacting carbon monoxide or a mixture of carbon oxides with hydrogen, at elevated temperature and pressure, in the presence of a catalyst composition consisting essentially of the oxides of copper, zinc and didymium. The catalyst composition is characterized by a high level of conversion of reactants to methanol at comparatively low pressures and temperatures.

DESCRIPTION OF THE PREFERRED EMBODIMENT

Process description.—The improved process of the invention is conducted by intimately contacting carbon monoxide, or a mixture of carbon oxides, with hydrogen in the presence of a catalyst composition consisting essentially of the oxides of copper, zinc and didymium. Without wishing to be bound by any particular theory, it appears likely that the reaction responsible for the formation of methanol in the process of the invention is represented by the equation given below:

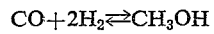

However, other carbon oxides and hydrogen compounds are suitably utilized as carbon monoxide and hydrogen precursors. For example, the following reactions are known to occur at elevated temperature:

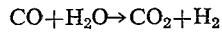
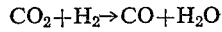

Thus, a mixture of an excess of carbon monoxide and water, or alternatively, a mixture of carbon dioxide and an excess of hydrogen may be used for the reaction to produce methanol. However, the utilization of such precursor mixtures offer no apparent advantage. Accordingly, the use of carbon monoxide and hydrogen for conversion to methanol is preferred. However, on occasion the presence of some carbon dioxide in the reaction mixture of carbon monoxide and hydrogen enhances the activity of the copper-zinc-didymium containing oxide catalyst. For this reason, it is an advantage to have some carbon dioxide present in the reactant gaseous mixture, for example, up to about 50% by weight of the total carbon oxide mixture.

From stoichiometric considerations of the reaction, as depicted above, 2 moles of hydrogen react with 1 mole of carbon monoxide to produce methanol. When carbon dioxide is present, the stoichiometric considerations, as depicted above, require 3 moles of hydrogen per mole of whatever carbon dioxide is present to carry out the reaction to methanol. In practice, however, other ratios of reactants give satisfactory results and in some instances are to be preferred. Molar ratios of hydrogen to carbon oxides from about 2:1 to about 10:1 are satisfactory with best results being obtained when hydrogen is used in excess of the stoichiometric amount.

The catalyst.—The catalyst composition employed in the production of methanol by the process of this invention comprises the mixture of copper oxide and zinc oxide, modified by the inclusion therewith of didymium oxide. The term "didymium" is frequently used to indicate a mixture containing all the rare earth metals other than cerium, in a ratio as found occurring in nature. For example, didymium mixtures contain the following rare earth metal oxides in the following amounts: $La_2O_3$—up to 80%; $Nd_2O_3$—up to 80%; $Pr_6O_{11}$—up to 40%; $Sm_2O_3$—up to 30%; $Gd_2O_3$—up to 30%; other rare earth metal oxides—up to 30%. Percentages of the different rare earth metal oxides present in typical didymium mixtures are: $La_2O_3$ 40–50%; $Nd_2O_3$ 25–40%; $Pr_6O_{11}$ 5–15%; $Sm_2O_3$ 2–10%; $Gd_2O_3$ 2–10%; other rare earth metal oxides 1–10%. However, as used herein, the term "didymium" is used in a broader sense, namely, to indicate any mixture containing at least two of the rare earth metals, e.g., the metals of the Lanthanide series, free from substantial amounts of cerium, in ratios as occurring in nature. Thus, one or more rare earth metals may have been removed entirely or partly from a naturally occurring mixture, while leaving the remaining rare earth metals in their naturally occurring ratio. In many examples of didymium, lanthanum and neodymium are the most frequently occurring rare earth metals, while smaller quantities of praseodymium and samarium are present. Such a didymium mixture is represented by the following analysis: $La_2O_3$—45%; $Nd_2O_3$—38%; $Pr_6O_{11}$—11%; $Sm_2O_3$—4% and other rare earth metal oxides—2%. In other didymium mixtures, neodymium and praseodymium are the most abundant rare earth metals, while only smaller quantities of the other rare earth metals are present. Such a didymium mixture is represented by the following analysis: $La_2O_3$—less than 1%; $Nd_2O_3$—72%; $Pr_6O_{11}$—27%; $Sm_2O_3$—less than 1%; other rare earth metal oxides—traces.

The inclusion of didymium oxide as a catalyst modifier is a critical feature of the catalyst composition. Although the precise role of the catalyst modifier is not known with certainty, it is evident that the modifier plays a substantial role in providing a catalyst composition which exhibits high activity for the production of methanol from carbon monoxide and hydrogen, or from precursors thereof, at comparatively low temperatures and pressures. For example, when catalysts containing oxides of copper, zinc, and individual rare earth metals were evaluated at a temperature of 300° C. and a pressure of 750 p.s.i.g., yields of methanol were obtained in the range of 0.40–0.49 kg./l./hr. This is little improvement over a catalyst composed only of copper oxide and zinc oxide which, under similar conditions, yielded 0.32 kg./l./hr. of methanol. However, a catalyst composed of the oxides of copper, zinc and didymium yielded as much as 1.01 kg./l./hr. of methanol—more than two times the yield of the other catalysts. These data are presented in Table II of Illustrative Embodiment V.

The precise amount of catalyst modifier is not critical. Data obtained from a series of experimental runs wherein the didymium content of the catalyst was varied are presented in Table III of Illustrative Embodiment VI. In general, amounts of catalyst modifier of from about 1.0% to about 25% by weight, based on total catalyst composition and calculated as metal, are satisfactory, with amounts of catalyst modifier of from about 4% to about 15% by weight, on the same basis being preferred.

The relative proportions of copper oxide to zinc oxide to be employed in the catalyst composition can be varied. Data obtained from a series of experimental runs wherein the ratio of copper to zinc was varied are presented in Table IV of Illustrative Embodiment VII. In general, ratios from about 1:10 to about 20:1, calculated as weight percent metal, are satisfactory with ratios of from about 1:1 to 10:1, calculated on the same basis, being preferred.

The form in which the copper, zinc and didymium are employed is the oxide, although compounds which are readily converted to the oxide, e.g., the corresponding metal carbonates, are also suitably initially employed as these are converted to the oxide, e.g., as during pretreatment subsequent to the formation of the initially prepared catalyst composition.

The catalyst composition is preferably prepared by coprecipitating the metals from a solution of their nitrates in the form of one or more compounds readily convertible to oxides. For example, the mixed nitrates may be combined with a solution of a carbonate to co-precipitate the metals as carbonates. The precipitation should be effected at a temperature of about 85° C.–90° C. The precipitate thus obtained is a mixture of carbonates, basic carbonates and hydroxides. It is collected, washed substantially free of electrolytes, then dried and calcined at a temperature of from about 200° C. to about 400° C., a temperature of from about 250° C. to about 300° C. being preferred. The calcined material is shaped by, for example, pelleting under pressure using graphite as a lubricant. The oxide mixture, in some instances, is pretreated to bring it its most active state. Pretreatment is accomplished by passing a stream of hydrogen or hydrogen mixed with carbon monoxide over the catalyst.

In some applications it may be preferable to employ the catalyst on an inert, neutral support, e.g., silica, alumina, or the like, but in the preferred modification, the catalyst is employed unsupported.

Process conditions.—The catalyst composition of the invention serves to catalyze methanol production in the vapor phase at elevated temperature and pressure. Reaction temperatures are not critical and temperatures from about 200° C. to about 350° C. are satisfactory, with the temperature range from about 225° C. to about 300° C. being preferred. The reaction pressure to be employed will depend chiefly upon the temperature employed as well as the quantity and ratio of the reactants present, as in most cases the reaction pressure approximates the summation of the partial pressures of the individual reactants present. From the stoichiometric considerations depicted above, it is apparent that methanol production is favored at high pressures. However, economic considerations often dictate that the reaction be conducted at lower pressures. The high activity of the copper-zinc-didymium containing catalyst makes it possible to carry out the reaction at comparatively low pressures and thus realize economic savings. Although the catalyst functions at pressures of from about 15 p.s.i.g. to about 5,000 p.s.i.g., it is preferable to carry out the reaction at a pressure of from about 500 p.s.i.g. to about 1,500 p.s.i.g.

The catalyst composition may be employed in batchwise operations or in a continuous manner as by passing the reactants through a tubular reactor containing the catalyst and maintained at reaction temperature.

Subsequent to reaction, the product mixture is separated and the methanol is recovered by conventional methods, e.g., selective condensation, selective adsorption and the like.

The catalyst composition of the invention is used in the production of methanol, a chemical of commerce, useful, for example, as a solvent and as a chemical intermediate in the manufacture of formaldehyde, a basic raw material for certain synthetic resins, plastics and adhesives.

To further illustrate the improved catalyst composition of the invention and its use in methanol production, the following examples are provided. It should be understood that the details thereof are not to be regarded as limitations.

Illustrative Embodiment I

A gas mixture of hydrogen and carbon monoxide in a molar ratio of 2 to 1 was introduced into a continuous reactor at 270° C. and at a pressure of 750 p.s.i.g. to contact a catalyst containing 4 wt. percent didymium (composition: $La_2O_3$—45%; $Nd_2O_3$—38%; $Pr_6O_{11}$—11%; $Sm_2O_3$—4%; other rare earth metal oxides—2%), 40 wt. percent copper, and 18 wt. percent zinc as oxides which had been treated with hydrogen prior to use. The reactants were passed over the catalyst at a space velocity of 10,300 volumes of reactants per volume of catalyst per hour, measured at standard conditions. The conversion of carbon monoxide to methanol was found to be 17.5 wt. percent.

The reaction product was collected, condensed, and the liquid product analyzed. It was determined that the yield of liquid product was 0.812 kilogram per liter of catalyst per hour and the product analyzed 99.1% methanol. The organic impurities were less than 0.9%.

Illustrative Embodiment II

The procedure of Illustrative Embodiment I was repeated except that a gas mixture of 66.1 wt. percent hydrogen, 19.5 wt. percent carbon monoxide, and 14.4 wt. percent carbon dioxide was introduced into a continuous reactor to contact the catalyst as described in Illustrative Embodiment I. The conversion of carbon oxides to methanol was found to be 21.0 wt. percent. The yield of liquid product was 1.05 kilograms per liter of catalyst per hour and the product analyzed 92.9% methanol. The organic impurities were less than 0.1%.

Illustrative Embodiment III

The procedure of Illustrative Embodiment I is repeated employing a catalyst wherein the didymium has the following composition: $La_2O_3$—less than 1%; $Nd_2O_3$—72%; $Pr_6O_{11}$—27%; $Sm_2O_3$—less than 1%; other rare earth metal oxides—traces. Another useful didymium catalyst has the following composition: $La_2O_3$—70%; $Sm_2O_3$—15%; $Gd_2O_3$—13%; other rare earth metal oxides—2%.

Illustrative Embodiment IV

A series of runs was made wherein the copper-zinc-didymium containing oxide catalyst was compared with catalyst mixtures of any two of the components. For comparative purposes other commercial catalyst compositions were tested. The catalyst composition and test procedure was otherwise the same as described in Illustrative Embodiment I. The copper-zinc-didyminum catalyst exhibits improved catalytic activity at 300° C. and was decidedly more active at 250° C. at which temperature the other catalysts exhibited a very low activity. The data are presented in Table I.

a very active catalyst for the conversion of carbon oxides and hydrogen to methanol at high yields.

TABLE III

| Wt. percent didymium (Cu/Zn ratio) | Temperature, °C. | Pressure, p.s.i.g. | GHSV ×10⁻³ | Conversion, wt. percent | Yield, kg./l/hr. |
|---|---|---|---|---|---|
| 0 (47:20) | 250 | 750 | ~14 | 0 | Tr. |
| 0 (47:20) | 300 | 750 | 13.9 | 5.5 | 0.32 |
| 4.0 (44:16) | 250 | 750 | 10.4 | 13.8 | 0.65 |
| 4.0 (44:16) | 300 | 750 | 10.9 | 20.5 | 1.01 |
| 8.0 (40:18) | 250 | 750 | 9.7 | 23.5 | 1.07 |
| 13.0 (38:17) | 300 | 750 | 10.6 | 15.2 | 0.72 |
| 23.8 (30:11) | 300 | 750 | 10.6 | 12.5 | 0.64 |

Illustrative Embodiment VII

A series of runs was made wherein the ratio of copper to zinc in the copper-zinc-didymium containing oxide catalyst was varied while maintaining a didymium content of 4 wt. percent. The test procedure was otherwise the same as in Illustrative Embodiment I. The data shown in Table IV demonstrate that a wide range of copper/zinc ratios are active with best results occurring when the copper/zinc ratio is at least 1:1.

TABLE IV

| Cu/Zn ratio | Temperature, °C. | Pressure, p.s.i.g. | GHSV × 10⁻³ | Conversion, wt. percent | Yield, kg./l/hr. |
|---|---|---|---|---|---|
| 68/5 | 275 | 750 | 11.2 | 15.7 | 0.796 |
| 60/9 | 300 | 750 | 15.7 | 14.8 | 1.037 |
| 40/18 | 270 | 750 | 10.3 | 17.5 | 0.812 |
| 30/30 | 275 | 750 | 8.5 | 16.6 | 0.634 |
| 21/41 | 275 | 750 | 7.7 | 5.1 | 0.180 |

TABLE I

| Catalyst, wt. percent metals as oxides | Temperature, °C. | Pressure, p.s.i.g. | GHSV, 1/l/hr. ×10⁻³ | Conversion, wt. percent | Methanol yield, kg./l/hr. | Composition, wt. percent | | | |
|---|---|---|---|---|---|---|---|---|---|
| | | | | | | Methanol | Ethanol | Higher organics | Water |
| Cu-Zn-Di (40:18:4) | 300 | 750 | 10.9 | 20.5 | 1.01 | 98.4 | 0.2 | 1.1 | 0.3 |
| | 250 | 750 | 11.5 | 16.4 | 0.69 | ~100 | Tr. | Tr. | Tr. |
| Cu-Di (58:21) | 300 | 750 | 10.8 | 8.2 | 0.40 | 97.6 | 1.2 | | 1.2 |
| | 250 | 750 | 10.8 | ~0 | Tr. | | | | |
| Zn-Di (49:25) | 300 | 750 | 8.0 | 2.9 | 0.12 | 98.2 | Tr. | Tr. | 1.8 |
| | 250 | 750 | 8.0 | ~0 | Tr. | | | | |
| Cu-Zn ¹ (47:20) | 300 | 750 | 13.9 | 5.5 | 0.32 | 93.0 | 3.5 | 0.2 | 3.3 |
| | 250 | 750 | 11.0 | ~0 | Tr. | | | | |
| Cu-Cr ² (36:21) | 350 | 750 | 7.6 | 3.6 | 0.13 | 92.6 | 1.3 | 1.4 | 4.7 |
| | 250 | 750 | 7.6 | ~0 | Tr. | | | | |
| Cu-Zn-Cr ³ (41:14:4) | 300 | 750 | 10.4 | 15.4 | 0.63 | 97.6 | 1.1 | | 1.3 |
| | 250 | 750 | 10.4 | 7.2 | 0.34 | 99.6 | <.1 | <.1 | 0.3 |

¹ Exothermic methanation reaction occurs at temperatures above 300° C.
² Harshaw Copper Chromite Catalyst.
³ Catalyst prepared according to U.S. Patent No. 3,326,956 (ICI).

Illustrative Embodiment V

A series of runs was made using individual rare earth oxides rather than a didymium mixture. The test procedure was otherwise the same as described in Illustrative Embodiment I. The data shown in Table II demonstrate that the copper-zinc-didymium combination exhibits an improved catalytic effect for the production of methanol. This is particularly true at a temperature of 250° C. where the other catalysts showed markedly lower catalytic activities.

We claim as our invention:

1. A novel catalyst composition consisting essentially of a mixture of oxides of copper, zinc and didymium wherein the amount of didymium is from 1 to 25 weight percent based on total catalyst composition and calculated as metal and wherein the relative proportions of copper oxide to zinc oxide are from 1:10 to 20:1, calculated as weight percent metal, said didymium being a mixture of at least two of the rare earth metal oxides of the Lanthanide

TABLE II

| Catalyst, wt. percent metals as oxides | Temperature, °C. | Pressure, p.s.i.g. | GHSV, 1/l/hr. ×10⁻³ | Conversion, wt. percent | Methanol yield, kg./l/hr. | Composition, wt. percent | | | |
|---|---|---|---|---|---|---|---|---|---|
| | | | | | | Methanol | Ethanol | Higher organics | Water |
| Cu-Zn-Di (40:18:4) | 300 | 750 | 10.9 | 20.5 | 1.01 | 98.4 | 0.2 | 1.1 | 0.3 |
| | 250 | 750 | 11.5 | 16.4 | 0.69 | ~100 | Tr. | Tr. | Tr. |
| Cu-Zn-Ce (40:18:4) | 300 | 750 | 5.5 | 10.0 | 0.49 | 97.4 | 0.2 | 1.9 | 0.5 |
| | 250 | 750 | 7.6 | 13.3 | 0.45 | 99.3 | 0.2 | 0.2 | 0.3 |
| Cu-Zn-Pr (40:18:4) | 300 | 750 | 11.1 | 8.1 | 0.40 | 98.2 | 0.9 | Tr. | 0.9 |
| | 250 | 750 | 11.4 | 3.2 | 0.33 | 98.7 | 0.2 | Tr. | 1.1 |
| Cu-Zn-Nd (40:18:4) | 300 | 750 | 8.9 | 10.3 | 0.47 | 97.3 | 1.3 | | 1.4 |
| | 250 | 750 | 9.3 | 6.2 | 0.25 | 97.4 | 0.4 | 0.8 | 1.7 |
| Cu-Zn (47:20) | 300 | 750 | 13.9 | 5.5 | 0.32 | 93.0 | 3.5 | 0.2 | 3.3 |
| | 250 | 750 | 14.0 | ~0 | Tr. | | | | |

Illustrative Embodiment VI

A series of runs was made wherein the didymium content of the copper-zinc-didymium containing oxide catalyst was varied from 0 to 23.8 wt. percent. The test procedure was otherwise the same as described in Illustrative Embodiment I. The data shown in Table III demonstrate that the inclusion of as little as 4% didymium results in Series of the Periodic Table, free from substantial amounts of cerium, in ratios as occurring in nature.

2. The composition of claim 1 wherein didymium is present in the composition in an amount of from 4 to 15 weight percent based on total catalyst composition and calculated as metal.

3. The composition of claim 2 wherein the oxides of copper and zinc are present in the composition in ratio to one another ranging from about 1:1 to 10:1, said ratio calculated as weight percent metal.

4. The composition of claim 3 wherein didymium consists essentially of a mixture of rare earth metal oxides in the following amounts: $La_2O_3$—40–50%; $Nd_2O_3$—25–40%; $Pr_6O_{11}$—5–15%; $Sm_2O_3$—2–10%; $Gd_2O_3$—2–10%; other rare earth metal oxides of the Lanthanide Series of the Periodic Table, other than cerium—1–10%.

5. The composition of claim 3 wherein didymium consists essentially of a mixture of rare earth metal oxides in the following amounts: $Nd_2O_3$—72%; $Pr_6O_{11}$—27%; other rare earth metal oxides of the Lanthanide Series of the Periodic Table, other than cerium—1%.

References Cited

FOREIGN PATENTS

| | | | |
|---|---|---|---|
| 229,715 | 2/1925 | Great Britain | 260—449.5 |
| 308,181 | 3/1929 | Great Britain | 260—449.5 |

DANIEL E. WYMAN, Primary Examiner

W. J. SHINE, Assistant Examiner

U.S. Cl. X.R.

252—475, 476; 260—449.5